United States Patent
Bittar (10) Patent No.: US 8,593,147 B2
(45) Date of Patent: Nov. 26, 2013

(54) RESISTIVITY LOGGING WITH REDUCED DIP ARTIFACTS

(75) Inventor: Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 702 days.

(21) Appl. No.: 12/373,558

(22) PCT Filed: Aug. 8, 2007

(86) PCT No.: PCT/US2007/075455
§ 371 (c)(1), (2), (4) Date: Jan. 19, 2010

(87) PCT Pub. No.: WO2008/021868
PCT Pub. Date: Feb. 21, 2008

(65) Prior Publication Data
US 2010/0127708 A1    May 27, 2010

Related U.S. Application Data (60) Provisional application No. 60/821,721, filed on Aug. 8, 2006.

(51) Int. Cl.
*G01V 3/18* (2006.01)
*G01V 3/00* (2006.01)

(52) U.S. Cl.
USPC .......................................... 324/339; 324/371

(58) Field of Classification Search
USPC .......... 324/332–343, 346, 348–356, 366–375
See application file for complete search history.

(56) References Cited

U.S. PATENT DOCUMENTS

| | | |
|---|---|---|
| 2,901,689 A | 8/1959 | Barrett |
| 3,014,177 A | 12/1961 | Hungerford et al. |
| 3,187,252 A | 6/1965 | Hungerford |
| 3,510,757 A | 5/1970 | Huston |
| 3,539,911 A | 11/1970 | Youmans et al. |

(Continued)

FOREIGN PATENT DOCUMENTS

| | | |
|---|---|---|
| EP | 0527089 | 2/1993 |
| EP | 0814349 | 12/1997 |

(Continued)

OTHER PUBLICATIONS

"Advisory Action", dated Apr. 13, 2007, U.S. Appl. No. 11/457,709, "Electromagnetic Wave Resistivity Tool Having a Tilted Antenna for Geosteering Within a Desired Payzone", filed Jul. 14, 2006.

(Continued)

*Primary Examiner* — Joshua Benitez-Rosario
(74) *Attorney, Agent, or Firm* — Krueger Iselin LLP; Benjamin Fite

(57) ABSTRACT

Systems and methods are disclosed for reducing boundary-related artifacts in logs taken from resistivity logging tools. Such tools often exhibit "horns" at boundaries between formation beds having different resistivities. A boundary indicator signal serves to identify the location of these boundaries. When derived from an azimuthally-sensitive resistivity tool, the bed boundary indicator may have a magnitude and shape that serves to nearly eliminate the horns even in high-dip angle environments. Logs that are processed to eliminate these artifacts are expected to be more accurate and thus easier to interpret.

16 Claims, 5 Drawing Sheets

(56) References Cited

U.S. PATENT DOCUMENTS

| | | |
|---|---|---|
| 3,808,520 A | 4/1974 | Runge |
| 3,982,176 A | 9/1976 | Meador |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A * | 11/1985 | Clark ............................ 324/338 |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| RE32,913 E | 4/1989 | Clark |
| 4,845,433 A | 7/1989 | Kleinberg |
| 4,873,488 A | 10/1989 | Barber et al. |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,968,940 A * | 11/1990 | Clark et al. ................... 324/338 |
| 4,980,643 A | 12/1990 | Gianzero et al. |
| 5,089,779 A | 2/1992 | Rorden |
| 5,115,198 A | 5/1992 | Gianzero et al. |
| 5,200,705 A | 4/1993 | Clark et al. |
| 5,210,495 A | 5/1993 | Hapashey et al. |
| 5,230,386 A | 7/1993 | Wu et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,389,881 A | 2/1995 | Bittar et al. |
| 5,402,068 A * | 3/1995 | Meador et al. ................ 324/338 |
| 5,442,294 A | 8/1995 | Rorden |
| 5,485,089 A | 1/1996 | Kuckes |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,589,775 A | 12/1996 | Kuckes |
| 5,594,343 A * | 1/1997 | Clark et al. ................... 324/338 |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,854,991 A | 12/1998 | Gupta et al. |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,147,496 A | 11/2000 | Strack et al. |
| 6,163,155 A | 12/2000 | Bittar |
| 6,181,138 B1 | 1/2001 | Hagiwara et al. |
| 6,191,586 B1 | 2/2001 | Bittar |
| 6,218,841 B1 | 4/2001 | Wu |
| 6,218,842 B1 | 4/2001 | Bittar |
| 6,297,639 B1 | 10/2001 | Clark et al. |
| 6,304,086 B1 * | 10/2001 | Minerbo et al. ............... 324/338 |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 | 11/2002 | Bittar |
| 6,538,447 B2 | 3/2003 | Bittar |
| 6,541,979 B2 | 4/2003 | Omeragic |
| 6,566,881 B2 | 5/2003 | Omeragic et al. |
| 6,573,722 B2 * | 6/2003 | Rosthal et al. ................ 324/338 |
| 6,614,229 B1 | 9/2003 | Clark et al. |
| 6,693,430 B2 | 2/2004 | Rosthal et al. |
| 6,710,600 B1 | 3/2004 | Kopecki et al. |
| 6,727,706 B2 | 4/2004 | Gao et al. |
| 6,736,222 B2 | 5/2004 | Kuckes et al. |
| 6,777,940 B2 | 8/2004 | Macune |
| 6,810,331 B2 | 10/2004 | Bittar et al. |
| 6,863,127 B2 | 3/2005 | Clark et al. |
| 6,885,943 B2 * | 4/2005 | Bittar et al. ....................... 702/7 |
| 6,900,640 B2 | 5/2005 | Fanini et al. |
| 6,911,824 B2 | 6/2005 | Bittar |
| 6,944,546 B2 | 9/2005 | Xiao et al. |
| 6,958,610 B2 | 10/2005 | Gianzero |
| 7,019,528 B2 | 3/2006 | Bittar |
| 7,038,455 B2 | 5/2006 | Beste et al. |
| 7,046,010 B2 | 5/2006 | Hu et al. |
| 7,138,803 B2 | 11/2006 | Bittar |
| 7,202,670 B2 | 4/2007 | Omeragic et al. |
| 7,227,363 B2 | 6/2007 | Gianzero et al. |
| 7,265,552 B2 * | 9/2007 | Bittar ............................ 324/337 |
| 7,345,487 B2 | 3/2008 | Bittar et al. |
| 7,394,257 B2 | 7/2008 | Martinez et al. |
| 7,427,863 B2 | 9/2008 | Bittar |
| 7,557,579 B2 | 7/2009 | Bittar |
| 7,557,580 B2 | 7/2009 | Bittar |
| 7,657,377 B2 | 2/2010 | Sinclair et al. |
| 7,659,722 B2 * | 2/2010 | Bittar ............................ 324/337 |
| 7,786,733 B2 | 8/2010 | Seydoux et al. |
| 7,848,887 B2 | 12/2010 | Yang et al. |
| 7,948,238 B2 | 5/2011 | Bittar |
| 8,085,049 B2 | 12/2011 | Bittar et al. |
| 8,085,050 B2 | 12/2011 | Bittar et al. |
| 8,222,902 B2 | 7/2012 | Bittar et al. |
| 8,264,228 B2 | 9/2012 | Bittar et al. |
| 8,274,289 B2 * | 9/2012 | Bittar et al. ................... 324/338 |
| 8,305,082 B2 * | 11/2012 | Merchant et al. ............. 324/343 |
| 8,319,498 B2 * | 11/2012 | Wang ............................ 324/369 |
| 8,433,518 B2 * | 4/2013 | Omeragic et al. .................. 702/7 |
| 8,487,625 B2 * | 7/2013 | Fang et al. ..................... 324/338 |
| 2003/0051914 A1 | 3/2003 | Bittar |
| 2003/0055565 A1 | 3/2003 | Omeragic |
| 2003/0076107 A1 | 4/2003 | Fanini et al. |
| 2003/0229450 A1 | 12/2003 | Strickland |
| 2004/0059513 A1 * | 3/2004 | Bittar et al. ....................... 702/7 |
| 2004/0196047 A1 | 10/2004 | Fanini et al. |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0134280 A1 * | 6/2005 | Bittar et al. ................... 324/367 |
| 2005/0140373 A1 | 6/2005 | Li et al. |
| 2005/0218898 A1 | 10/2005 | Fredette et al. |
| 2006/0011385 A1 | 1/2006 | Seydoux et al. |
| 2006/0015256 A1 | 1/2006 | Hassan et al. |
| 2006/0125479 A1 | 6/2006 | Chemali et al. |
| 2006/0244455 A1 | 11/2006 | Bittar |
| 2007/0278008 A1 | 12/2007 | Kuckes et al. |
| 2008/0018895 A1 | 1/2008 | Opsal |
| 2008/0136419 A1 | 6/2008 | Seydoux et al. |
| 2009/0015260 A1 | 1/2009 | Bittar |
| 2009/0230968 A1 | 9/2009 | Bittar et al. |
| 2010/0127708 A1 | 5/2010 | Bittar |
| 2011/0006773 A1 | 1/2011 | Bittar |
| 2011/0180327 A1 | 7/2011 | Bittar et al. |
| 2011/0221443 A1 * | 9/2011 | Bittar et al. ................... 324/339 |
| 2011/0234230 A1 | 9/2011 | Bittar et al. |
| 2011/0251794 A1 | 10/2011 | Bittar et al. |
| 2011/0309835 A1 | 12/2011 | Barber et al. |
| 2012/0249149 A1 | 10/2012 | Bittar et al. |
| 2012/0306500 A1 | 12/2012 | Bittar et al. |

FOREIGN PATENT DOCUMENTS

| | | |
|---|---|---|
| EP | 0840142 | 5/1998 |
| EP | 1155343 | 3/2011 |
| GB | 2279149 | 12/1994 |
| RU | 2279697 | 10/2003 |
| RU | 2305300 | 8/2007 |
| WO | WO9800733 | 1/1998 |

(56) References Cited

FOREIGN PATENT DOCUMENTS

| WO | WO0041006 | 7/2000 |
|---|---|---|
| WO | WO0155748 | 8/2001 |
| WO | WO-2007/149106 | 12/2007 |
| WO | WO-2007/7149106 | 12/2007 |

OTHER PUBLICATIONS

"Advisory Action", dated Sep. 15, 2005, U.S. Appl. No. 10/616,429, "Electromagnetic Wave Resistivity Tool Having a Tilted Antenna for Geosteering Within a Desired Payzone", filed Jul. 9, 2003.
"Canadian Office Action", dated Jun. 7, 2005, Application No. 2,415,563, "Electromagnetic Wave Resistivity Tool With a Tilted Antenna", filed Jul. 10, 2001.
"Canadian Office Action", dated Jan. 23, 2009, Application No. 2,415,563, "Electromagnetic Wave Resistivity Tool With a Tilted Antenna", filed Jan. 10, 2001.
"Canadian Office Action", dated Jan. 29, 2007, Application No. 2,415,563, "Electromagnetic Wave Resistivity Tool With a Tilted Antenna", filed Jul. 10, 2001.
"Canadian Office Action", dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000.
"Canadian Office Action", dated Nov. 1, 2007, Application No. 2,415,563, "Electromagnetic Wave Resistivity Tool With a Tilted Antenna", filed Jan. 10, 2001.
"European Office Action", dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Apr. 29, 2008, Application No. 00908351.0, "Electromagnetic Wave Resistivity Tool Having Tilted Antenna", filed Jan. 24, 2000.
"European Office Action", dated Jul. 31, 2007, Application No. 00908351.0, "Electromagnetic Wave Resistivity Tool Having Tilted Antenna", filed Jan. 24, 2000.
"European Office Action", dated Sep. 13, 2007, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Sep. 23, 3008, Application No. 01096 294.3, Electromagnetic wave resistivity tool having a tilted antenna for determining the horizontal and vertical resistivities and relative dip angle in anisotropic earth formations Jul. 10, 2001.
"European Supplemental Search Report", dated Jun. 12, 2003 Application No. 00908351.0, "Electromagnetic Wave Resistivity Tool Having Tilted Antenna", filed Jan. 24, 2000.
"Eurpoean Office Action", dated Sep. 27, 2005, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"PCT International Preliminary Examination Report", dated Nov. 4, 2002, Application No. PCT/US01/41319 "Electromagnetic Wave Resistivity Tool Having a Tilted Antenna for Geosteering Within a Desired Payzone", filed Jul. 10, 2001.
"PCT International Search Report and Written Opinion", dated May 15, 2000, Application No. PCT/US00/01693, "Electromagnetic Wave Resistivity Tool Having a Tilted Antenna for Determining the Horizontal and Vertical Resistivities and Relative Dip Angle in Anisotropic Earth Formations", 01/24/200.
"PCT International Search Report", dated Jan. 31, 2008, Application No. PCT/US07/15806, "Modular Geosteering Tool Assembly", filed Jul. 11, 2007.
"PCT International Search Report", dated Feb. 5, 2008, Application No. PCT/US07/64221, "Robust Inversion Systems and Methods for Azimuthally Sensitive Resistivity Logging Tools", filed Mar. 16, 2007.
"PCT International Search Report", dated Feb. 27, 2008, Application No. PCT/US07/75455, "Resistivity Logging with Reduced Dip Artifacts", filed Aug. 8, 2007.
"PCT International Search Report", dated Apr. 30, 2008, Application No. PCT/US06/62149, Antenna Coupling Component Measurement Tool Having a Rotating Antenna Configuration, filed Dec. 15, 2006.
"PCT International Search Report", dated May 15, 2002, Application No. PCT/US00/01693, Electromagnetic Wave Resistivity Tool Having a Tilted Antenna for Determining the Horizontal and Vertical Resistivities and Relative Dip Angle in Anisotropic Earth Formations, filed Jan. 24, 2000.
"PCT International Search Report", dated May 15, 2008, Application No. PCT/US07/15744, "Method and Apparatus for Building a Tilted Antenna", filed Jul. 11, 2007.
"PCT International Search Report", dated Sep. 18, 2001, Application No. PCT/US01/41319 "Electromagnetic Wave Resistivity Tool Having a Tilted Antenna for Geosteering Within a Desired Payzone", filed Jul. 10, 2001.
"PCT International Search Report", dated Sep. 18, 2001, Application No. US01/41319, "Electromagnetic Wave Resistivity Tool Having a Tilted Antenna for Determining the Horizontal and Vertical Resistivities and Relative Dip Angle in Anisotropic Earth Formations", filed Aug. 6, 2002.
"PCT Written Opinion", dated Aug. 6, 2002, International Application No. PCT/US01/41319, "Electromagnetic Wave Resistivity Tool Having a Tilted Antenna for Geosteering Within a Desired Payzone", filed Jul. 10, 2001.
"US Final Office Action", dated Jan. 19, 2007, U.S. Appl. No. 11/457,709, "Electromagnetic Wave Resistivity Tool Having a Tilted Antenna for Geosteering Within a Desired Payzone", filed Jul. 14, 2006.
"US Final Office Action", dated Jun. 6, 2005, U.S. Appl. No. 10/616,429, "Electromagnetic Wave Resistivity Tool Having a Tilted Antenna for Geosteering Within a Desired Payzone", filed Jul. 9, 2003.
"US Final Office Action", dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Formations", filed May 27, 2008.
"US Non-Final Office Action", dated Apr. 26, 2000, U.S. Appl. No. 09/238,832, "Electromagnetic Wave Resistivity Tool Having a Tilted Antenna for Determining the Horizontal and Vertical Resistivities and Relative Dip Angle in Anisotropic Earth Formations", filed Jan. 28, 1999.
"US Non-Final Office Action", dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Sep. 6, 2007, U.S. Appl. No. 11/745,822, Electromagnetic Wave Resistivity Tool Having a Tilted Antenna for Geosteering Within a Desired Payzone:, filed May 8, 2007.
"US Non-Final Office Action", dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005.
"US Non-Final Office Action", dated Aug. 18, 2006, U.S. Appl. No. 11/457,709, "Electromagnetic Wave Resistivity Tool Having a Tilted Antenna for Geosteering Within a Desired Payzone", filed Jul. 14, 2006.
Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006),pp. 1-14.
Bittar, Michael S., "Processing Resistivity Logs", U.S. Appl. No. 60/821,721, filed Aug. 8, 2006.

(56) References Cited

OTHER PUBLICATIONS

Bittar, Michael S., "Tool for Azimuthal Resistivity Measurement and Bed Boundary Detection", U.S. Appl. No. 60/821,988, filed Aug. 10, 2006.

Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figures.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs of Figures.

Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, (Jun. 19, 1994), 18 pgs.

Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.

Bittar, Michale S., PCT Application US2007/075455, filed Aug. 8, 2007, Resistivity Logging with Reduced Dip Artifacts.

Bonner, S. et al., "A New Generation of Electrode Resistivity Measurements for Formation Evaluation While Drilling", SPWLA 35th Annual Logging Symposium, (Jun. 19, 1994), pp. 1-19.

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", SPE Formation Evaluation, (Sep. 1990), pp. 263-271.

Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5, plus 3 pgs of Figures.

Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.

Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.

Mack, S. G., et al., "MWD Tool Accurately Measures Four Resistivities", Oil & Gas Journal, (May 25, 1992), pp. 1-5.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, 17 pgs.

Meyer, W. H., "New Two Frequency Propagation Resistivity Tools", SPWLA 36th Annual Logging Symposium, (Jun. 26-29, 1995),12 pgs.

Rodney, Paul F., et al., "Electromagnetic Wave Resistivity MWD Tool", SPE Drilling Engineering, (Oct. 1986), pp. 37-346.

Bittar, Michael S., et al., "A 3D Borehole Imager and a Dielectric Measurement Tool", PCT Appl No. US09/65537, filed Nov. 23, 2009, 13 pgs.

Bittar, Michael S., et al., "Antenna Coupling Component Measurement Tool Having a Rotating Antenna Configuration", PCT Appl No. US06/062149, filed Dec. 15, 2006, 26 pgs.

Bittar, Michael S., et al., "Antenna Coupling Component Measurement Tool Having a Rotating Antenna Configuration", U.S. Appl. No. 12/294,557, filed Sep. 25, 2008, 22 pgs.

Bittar, Michael S., et al., "EM-Guided Drilling Relative to an Existing Borehole", U.S. Appl. No. 12/526,552, filed Aug. 10, 2009, 13 pgs.

Bittar, Michael S., et al., "Look-Ahead Boundary Detection and Distance Measurement", U.S. Appl. No. 12/067,582, filed Mar. 20, 2008, 16 pgs.

Bittar, Michael S., et al., "Method and Apparatus for Building a Tilted Antenna", U.S. Appl. No. 12/306,954, filed Dec. 30, 2008, 13 pgs.

Bittar, Michael S., et al., "Method and Apparatus Having Antennas Configured to Measure Electrical Anisotropy", U.S. Appl. No. 12/088,061, filed Mar. 25, 2008, 16 pgs.

Bittar, Michael S., et al., "Method and Apparatus with High Resolution Electrode Configuration for Imaging in Oil-Based Muds", U.S. Appl. No. 12/680,868, filed Mar. 30, 2010, 16 pgs.

Bittar, Michael S., et al., "Modular Geosteering Tool Assembly", U.S. Appl. No. 12/306,267, filed Dec. 23, 2008, 16 pgs.

Bittar, Michael S., et al., "Multimodal Geosteering Systems and Methods", U.S. Appl. No. 12/679,502, filed Mar. 23, 2010, 20 pgs.

Bittar, Michael S., et al., "Robust Inversion Systems and Methods for Azimuthally Sensitive Resistivity Logging Tools", U.S. Appl. No. 12/229,760, filed Nov. 5, 2008, 15 pgs.

Bittar, Michael S., et al., "Systems and Methods for Displaying Logging Data", U.S. Appl. No. 12/295,158, filed Sep. 29, 2008, 15 pgs.

Bittar, Michael S., et al., "Systems and Methods Having Radially Offset Antennas for Electromagnetic Resistivity Logging", U.S. Appl. No. 12/300,876, filed Nov. 14, 2008, 16 pgs.

Gianzero, Stanley et al., "Method and Apparatus Having Antennas Configured to Measure Electrical Anisotropy", U.S. Appl. No. 10/173,528, filed Jun. 17, 2002, 24 pgs.

Gianzero, Stanley et al., "Method and Apparatus Having Antennas Configured to Measure Electrical Anisotropy", U.S. Appl. No. 10/957,415, filed Oct. 1, 2004, 27 pgs.

Moran, J. H. et al., "Effects of formation anisotropy on resistivity-logging measurements", Geophysics, vol. 44, No. 7 (Jul. 1979): p. 1266-1286, 21 Figs., 4 Tables., 21 pgs.

"Preliminary Report on Patentability", dated Jul. 29, 2010, Appl No. PCT/US08/51447, "EM-Guided Drilling Relative to an Existing Borehole", filed Jan. 18, 2008, 7 pgs.

"U.S. Final Office Action", dated Feb. 22, 2011, U.S. Appl. No. 12/689,435, "Tool for Azimuthal Resistivity Measurement and Bed Boundary Detection" filed Jan. 19, 2010, 10 pgs.

"U.S. Non-Final Office Action", dated Feb. 16, 2011, U.S. Appl. No. 12/294,557, "Antenna Coupling Component Measurement Tool Having a Rotating Antenna Configuration", filed Sep. 25, 2008, 16 pgs.

"U.S. Non-Final Office Action", dated Sep. 26, 2011, U.S. Appl. No. 12/294,557, "Antenna Coupling Component Measurement Tool Having a Rotating Antenna Configuration", filed Sep. 25, 2008, 9 pgs.

"US Final Office Action", dated Jul. 7, 2011, U.S. Appl. No. 12/299,760, "Robust Inversion Systems and Methods for Azimuthally Sensitive Resistivity Logging Tools", filed Nov. 5, 2008, 16 pgs.

"US Final Office Action", dated Nov. 17, 2011, U.S. Appl. No. 12/306,267, "Modular Geosteering Tool Assembly", filed Dec. 23, 2008, 14 pgs.

"US Final Office Action", dated Dec. 8, 2011, U.S. Appl. No. 12/306,954, "Method and Apparatus for Building a Tilted Antenna", filed Dec. 30, 2008, 17 pgs.

"US Non-Final Office Action", dated Mar. 13, 2012, U.S. Appl. No. 12/294,557, "Antenna Coupling Component Measurement Tool Having a Rotating Antenna Configuration", filed Sep. 25, 2008, 6 pgs.

"US Non-Final Office Action", dated Jul. 18, 2011, U.S. Appl. No. 12/306,954, "Method and Apparatus for Building a Tilted Antenna", filed Dec. 30, 2008, 21 pgs.

"US Non-Final Office Action", dated Nov. 26, 2010, U.S. Appl. No. 12/299,760, " Robust Inversion Systems and Methods for Azimuthally Sensitive Resistivity Logging Tools", filed Nov. 5, 2008, 18 pgs.

"US Non-Final Office Action", dated Dec. 23, 2010, U.S. Appl. No. 12/306,267, "Modular Geosteering Tool Assembly", filed Dec. 23, 2008, 18 pgs.

Sato, Motoyuki et al., "Directional Induction Logging Methods", SPWLA 35th Annual Logging Symposium, (Jun. 19-22, 1994),16 pgs.

(56) References Cited

OTHER PUBLICATIONS

Kashihara, Koji et al., "Proposal of a Directional Induction Tool", The First Annual Well Logging Symposium of Japan (Sep. 21-22, 1995), 8 pgs.

Lyons, William C., "Standard Handbook of Petroleum & Natural Gas Engineering", Gulf Publishing Company, Houston, Texas, vol. 1, (1996), pp. 497-498, and 979-980.

US Non-Final Office Action, dated Nov. 2, 2012, U.S. Appl. No. 12/526,552, "EM-Guided Drilling Relative to an Existing Borehole", filed Sep. 26, 2010, 9 pgs.

US Non-Final Office Action, dated Jan. 11, 2013, U.S. Appl. No. 12/689,435, "Tool for Azimuthal Resistivity Measurement and Bed Boundary Detection", filed Jan. 19, 2010, 6 pgs.

US Final Office Action, dated Mar. 26, 2013, U.S. Appl. No. 12/526,552, "EM-Guided Drilling Relative to an Existing Borehole", filed Sep. 26, 2010, 11 pgs.

US Final Office Action, dated Apr. 2, 2013, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", filed Apr. 7, 2011, 32 pgs.

\* cited by examiner

FIG. 7

RESISTIVITY LOGGING WITH REDUCED DIP ARTIFACTS

BACKGROUND

The gathering of downhole information has been done by the oil industry for many years. Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging", and can be performed during the drilling process itself.

Various measurement tools exist for use in wireline logging and logging while drilling. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of the receive signals are compared to each other to measure the formation resistivity.

When plotted as a function of depth or tool position in the borehole, the resistivity tool measurements are termed "logs" or "resistivity logs". Such logs may provide indications of hydrocarbon concentrations and other information useful to drillers and completion engineers. However, such logs may exhibit limited spatial resolution and boundary-related artifacts that make interpretation difficult, particularly in situations where the borehole penetrates formations at an angle. Various techniques exist for processing logs to improve resolution and reduce artifacts, but such techniques may not be feasible for use in a real-time environment.

BRIEF DESCRIPTION OF THE DRAWINGS

In the following detailed description of the various disclosed embodiments, reference will now be made to the accompanying drawings in which.

While the described embodiments are susceptible to various modifications and alternative forms, specific examples thereof are shown for illustrative purposes and will be described in detail below. It should be understood, however, that the drawings and detailed description thereto are not intended to limit the claims to the particular examples described, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The foregoing background section identifies various potential shortcomings of existing resistivity logging systems and methods that are at least in part addressed by the systems and methods disclosed below. Some resistivity logging system embodiments include an azimuthally sensitive resistivity tool that makes at least one formation resistivity measurement and at least one boundary detection measurement that can be combined to reduce boundary-related artifacts in the formation resistivity measurement. Various logging method embodiments employ the boundary detection measurement to operate on the formation resistivity measurement to reduce boundary-related artifacts in a number of ways.

Figure 1:
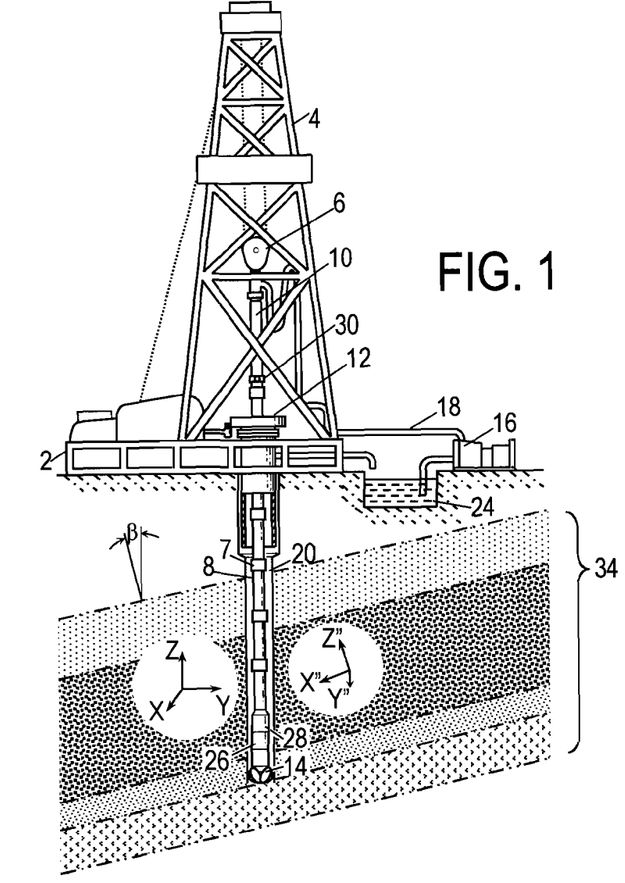
FIG. 1 shows an illustrative logging while drilling environment.

As one illustrative context for the disclosed systems and methods, FIG. 1 shows a well during drilling operations. A drilling platform 2 is equipped with a derrick 4 that supports a hoist 6. Drilling is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

Logging while drilling (LWD) sensors 26 are located in the drillstring 8 near the drill bit 14. Sensors 26 include directional instrumentation and a modular resistivity tool with tilted antennas for detecting bed boundaries. The directional instrumentation measures the inclination angle, the horizontal angle, and the rotational angle (a.k.a. "tool face angle") of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore. In some embodiments, directional measurements are made as follows: a three axis accelerometer measures the earth's gravitational field vector relative to the tool axis and a point on the circumference of the tool called the "tool face scribe line". (The tool face scribe line is drawn on the tool surface as a line parallel to the tool axis.) From this measurement, the inclination and tool face angle of the LWD tool can be determined. Additionally, a three axis magnetometer measures the earth's magnetic field vector in a similar manner. From the combined magnetometer and accelerometer data, the horizontal angle of the LWD tool can be determined. In addition, a gyroscope or other form of inertial sensor may be incorporated to perform position measurements and further refine the orientation measurements.

In a some embodiments, downhole sensors 26 are coupled to a telemetry transmitter 28 that transmits telemetry signals by modulating the resistance to mud flow in drill string 8. A telemetry receiver 30 is coupled to the kelly 10 to receive transmitted telemetry signals. Other telemetry transmission techniques are well known and may be used. The receiver 30 communicates the telemetry to a surface installation (not shown) that processes and stores the measurements. The surface installation typically includes a computer system of some kind, e.g. a desktop computer, that may be used to inform the driller of the downhole measurements such as formation resistivity and/or relative position and distance between the drill bit and nearby bed boundaries.

The drill bit 14 is shown penetrating a formation having a series of layered beds 34 dipping at an angle. A first (x,y,z) coordinate system associated with the sensors 26 is shown, and a second coordinate system (x",y",z") associated with the beds 32 is shown. The bed coordinate system has the z" axis perpendicular to the bedding plane, has the y" axis in a horizontal plane, and has the x" axis pointing "downhill". The angle between the z-axes of the two coordinate systems is referred to as the "dip" and is shown in FIG. 1 as the angle β.

Figure 2:
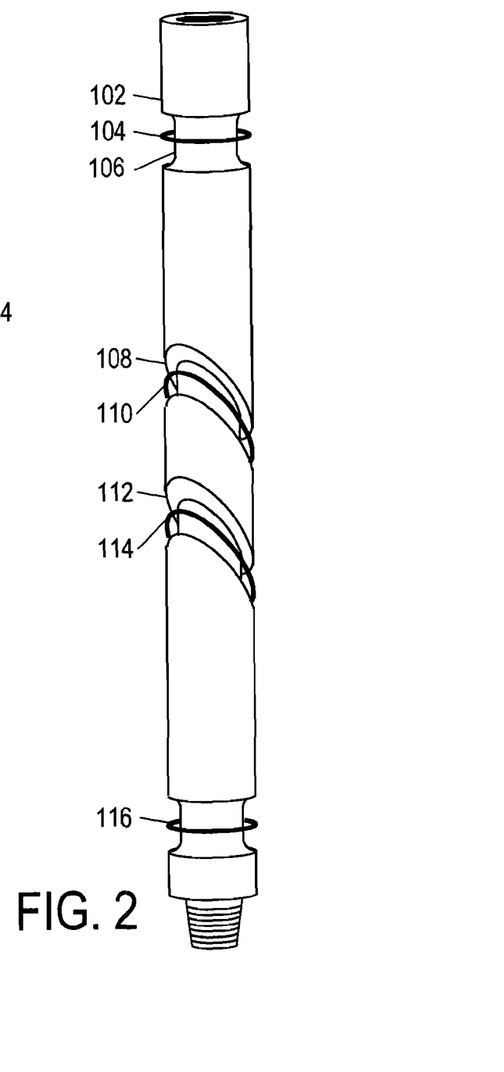
FIG. 2 shows an illustrative resistivity logging tool having tilted receiver antennas.

Referring now to FIG. 2, an illustrative resistivity tool 102 is shown. The subassembly 102 is provided with one or more regions 106 of reduced diameter. A wire coil 104 is placed in the region 106 and spaced away from the surface of 102 by a constant distance. To mechanically support and protect the coil 104, a non-conductive filler material (not shown) such as epoxy, rubber, fiberglass, or ceramics may be used in the reduced diameter regions 106. The transmitter and receiver coils may comprise as little as one loop of wire, although more loops may provide additional signal power. The distance between the coils and the tool surface is preferably in the range from 1/16 inch to 3/4 inch, but may be larger.

Figure 3:
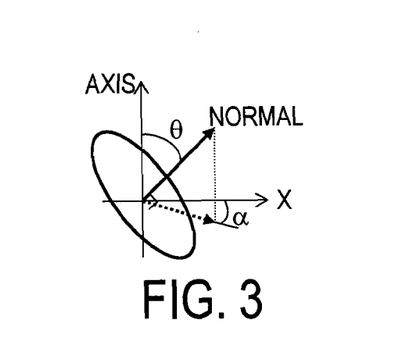
FIG. 3 provides a coordinate system for describing antenna orientation.

Coils 104 and 116 are coaxial with tool 102, meaning that the axes of coils 104 and 116 coincide with the tool axis. The illustrated tool 102 further includes a first angled recess 108 having a tilted coil antenna 110, and a second angled recess 112 having a second tilted coil antenna 114. The term "tilted" indicates that the plane of the coil is not perpendicular to the tool axis. FIG. 3 shows an antenna that lies within a plane having a normal vector at an angle of θ with the tool axis and at an azimuth of α with respect to the tool face scribe line. When θ equals zero, the antenna is said to be coaxial, and when θ is greater than zero the antenna is said to be tilted.

In some contemplated embodiments, coils 104 and 116 are used as transmitter antennas, and coils 110 and 114 are used as receiving antennas. However, one of ordinary skill in the art will recognize that the transmitting and receiving roles may be readily interchanged. Moreover, in some alternative embodiments, coils 104 and 116 may be tilted while coils 110 and 114 are coaxial. In operation, a transmitter coil 104 transmits an interrogating electromagnetic signal which propagates through the well bore and into the surrounding formation. Signals from the formation reach receiver coils 110, 114, inducing a signal voltage that is detected and measured to determine an amplitude attenuation and phase shift between coils 110 and 112. The measurement is repeated using transmitter 116. From the measured attenuation and phase shifts, the resistivity of the formation can be estimated using conventional techniques.

In the illustrated embodiment of FIG. 2, the receiver coils are tilted with a 45° angle between the normal and the tool axis. Angles other than 45° may be employed, and in some contemplated embodiments, the receiver coils are tilted at unequal angles or are tilted in different azimuthal directions. In many cases, the tool 102 will rotate during the drilling (and logging) process, so that resistivity measurements can be made with the tilted coils oriented in different azimuthal directions. These measurements may be correlated with tool orientation measurements to enable detection of boundary distances and directions. In other embodiments, virtual antenna steering may be used to synthesize a measurement from any desired antenna orientation given measurements from a sufficiently diverse set of fixed antennas. Further details on virtual antenna steering are available in U.S. Pat. No. 6,181,138, "Directional resistivity measurements for azimuthal proximity detection of bed boundaries," to T. Hagiwara and H. Song.

As suggested in U.S. Pat. No. 7,138,803, "Electromagnetic Wave Resistivity Tool Having a Tilted Antenna for Geosteering within a Desired Payzone," to Michael Bittar, the receivers of tool 102 have azimuthal sensitivities in opposite directions when receiving from the different transmitters. The phase differences in response to the first and second transmitters can be expressed as:

$$\delta_{T1}(\gamma) = \Phi_{R1T1}(\gamma) - \Phi_{R2T1}(\gamma) \quad (1)$$

$$\delta_{T2}(\gamma) = \Phi_{R2T2}(\gamma) - \Phi_{R1T2}(\gamma) \quad (2)$$

where, e.g., $\Phi_{R2T1}$ represents the phase of Receiver 2's voltage signal in response to the signal sent by Transmitter 1, and angle γ is the rotational orientation of the tool. Apart from a longitudinal shift in tool position, $$\delta_{T2}(\gamma) \approx \delta_{T1}(\gamma + 180°). \quad (3)$$

This observation will be helpful to the understanding relationships between the various alternative bed boundary indicators below.

Figure 4:
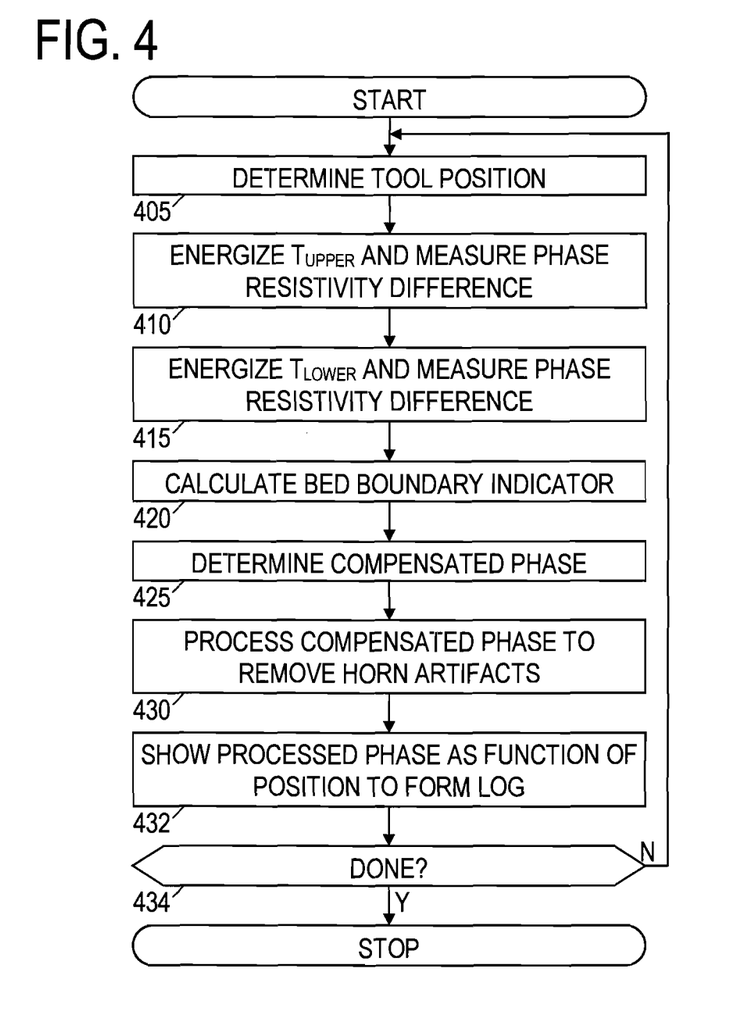
FIG. 4 shows a flowchart of an illustrative processing method to reduce artifacts in resistivity logs.

FIG. 4 shows a flowchart of an illustrative method for generating a resistivity log using the tool of FIG. 2. This method may be performed by a processor in the tool alone or in cooperation with a surface computing facility. Beginning in block 405, the tool's position is determined. This position determination may include tool orientation and eccentricity, but at a minimum it includes a determination of the tool's depth or position along the length of the borehole so as to permit later correlation with independent measurements of formation properties from other sources. In block 410, the first transmitter transmits an electromagnetic signal, which propagates through the formation and induces a voltage signal in each of the two receivers. The received signals may be combined to determine an amplitude ratio (attenuation) and a phase difference in the electromagnetic fields at the receiver positions. In block 415, a similar attenuation and phase difference is measured with respect to the second transmitter. The measurements of blocks 410 and 415 are preferably performed quickly enough so that tool motion during and between the two measurements is negligible or easily compensable.

In block 420, a bed boundary indicator is calculated from the attenuation and/or phase measurements of blocks 410 and 415. The bed boundary indicator is a signal having a magnitude that is near zero for distant boundaries and grows larger for nearby boundaries. The polarity of the bed boundary indicator may be indicative of whether the boundary is with a bed of higher or lower resistivity than the current bed. The bed boundary indicators described hereafter are derived from observations in opposite azimuthal directions. One bed boundary indicator is:

$$I(\gamma) = \delta_{T1}(\gamma) - \delta_{T1}(\gamma + 180°). \tag{4}$$

Equations (3) and (4) can be combined to create an alternative bed boundary indicator:

$$I(\gamma) = \delta_{T1}(\gamma) - \delta_{T2}(\gamma). \tag{5}$$

Or, rather than simply comparing in opposite directions, an integral or average may be used as a baseline for determining the indicator:

$$I(\gamma) = \delta_{T1}(\gamma) - \frac{1}{2\pi} \int_{-\pi}^{\pi} [\delta_{T1}(\gamma)] d\gamma, \text{ or} \tag{6}$$

$$I(\gamma) = \delta_{T2}(\gamma - \pi) - \frac{1}{2\pi} \int_{-\pi}^{\pi} [\delta_{T2}(\gamma)] d\gamma, \tag{7}$$

where γ is now expressed in radians. As yet another alternative, equations (6) and (7) may be averaged or added together (after accounting for the longitudinal shift):

$$I(\gamma) = [\delta_{T1}(\gamma) + \delta_{T2}(\gamma - \pi)] - \frac{1}{2\pi} \int_{-\pi}^{\pi} [\delta_{T1}(\gamma) + \delta_{T2}(\gamma)] d\gamma. \tag{8}$$

A potential advantage of using measurements from both transmitter antennas (and accounting for the appropriate longitudinal shift) is that the inherent errors of the phase measurement circuitry (perhaps due to thermal drift) can be automatically compensated.

The foregoing bed boundary indicators have been based on the measured phase shift. An alternative basis for the bed boundary indicators is the attenuation:

$$\delta_{T1}(\gamma) = \ln(A_{R1T1}(\gamma)) - \ln(A_{R2T1}(\gamma)) \tag{9}$$

$$\delta_{T2}(\gamma) = \ln(A_{R2T2}(\gamma)) - \ln(A_{R1T2}(\gamma)) \tag{10}$$

where, e.g., $A_{R1T2}$ represents the amplitude of Receiver 1's voltage signal in response to the signal sent by Transmitter 2. The foregoing bed boundary indicator equations (4)-(8) can be based on the values taken from equations (9) and (10).

Figure 7:
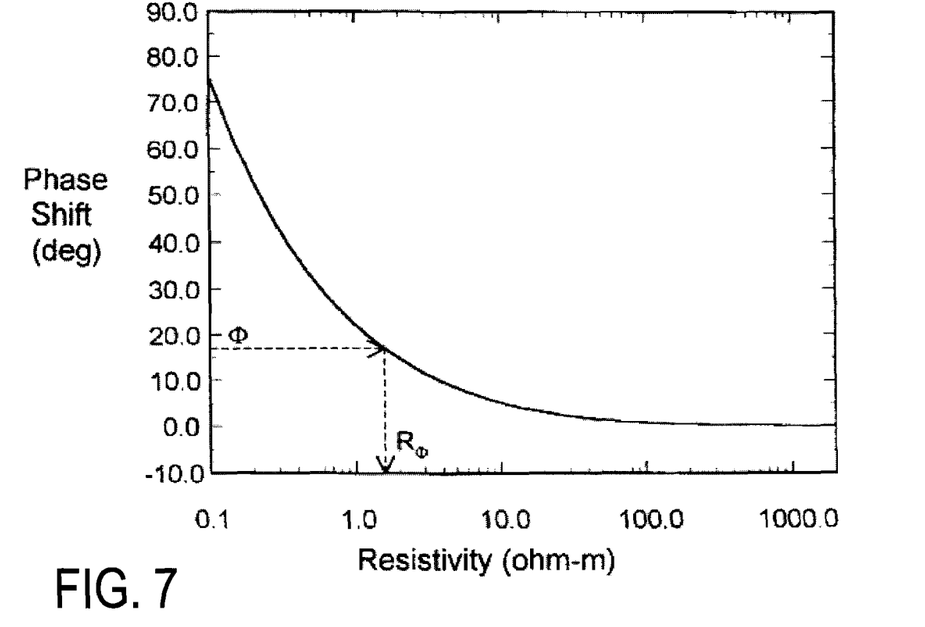
FIG. 7 shows an illustrative conversion of phase difference to resistivity.

Monotonic functions of the phase and/or attenuation can also be incorporated into the bed boundary indicator calculations without departing from the scope and spirit of the claims. One particularly suitable example of a monotonic function is the formation resistivity that the tool is designed to calculate. FIG. 7 illustrates one possible resistivity function, though in practice other parameters may be included in the resistivity determination to account for formation dip, borehole size, tool eccentricity, etc. Representing the monotonic (e.g., resistivity) function by R(.), equations (4)-(8) become:

$$I(\gamma) = R(\delta_{T1}(\gamma)) - R(\delta_{T1}(\gamma + 180°)). \tag{11}$$

$$I(\gamma) = R(\delta_{T1}(\gamma)) - R(\delta_{T1}(\gamma)). \tag{12}$$

$$I(\gamma) = R(\delta_{T1}(\gamma)) - \frac{1}{2\pi} \int_{-\pi}^{\pi} [R(\delta_{T1}(\gamma))] d\gamma, \text{ or} \tag{13}$$

$$I(\gamma) = R(\delta_{T2}(\gamma - \pi)) - \frac{1}{2\pi} \int_{-\pi}^{\pi} [R(\delta_{T2}(\gamma))] d\gamma, \tag{14}$$

$$I(\gamma) = [R(\delta_{T1}(\gamma)) + R(\delta_{T2}(\gamma - \pi))] - \frac{1}{2\pi} \int_{-\pi}^{\pi} [R(\delta_{T1}(\gamma)) + R(\delta_{T2}(\gamma))] d\gamma. \tag{15}$$

In block 425 (FIG. 4), a compensated phase difference is determined. The compensated phase difference is the average of the phase differences in response to the first and second transmitters (with an appropriate longitudinal position shift to align the centers of each transmitter-receiver arrangement):

$$\delta_C = \frac{1}{2\pi} \int_{-\pi}^{\pi} [\delta_{T1}(\gamma) + \delta_{T2}(\gamma)]/2 d\gamma \tag{16}$$

Figure 5:
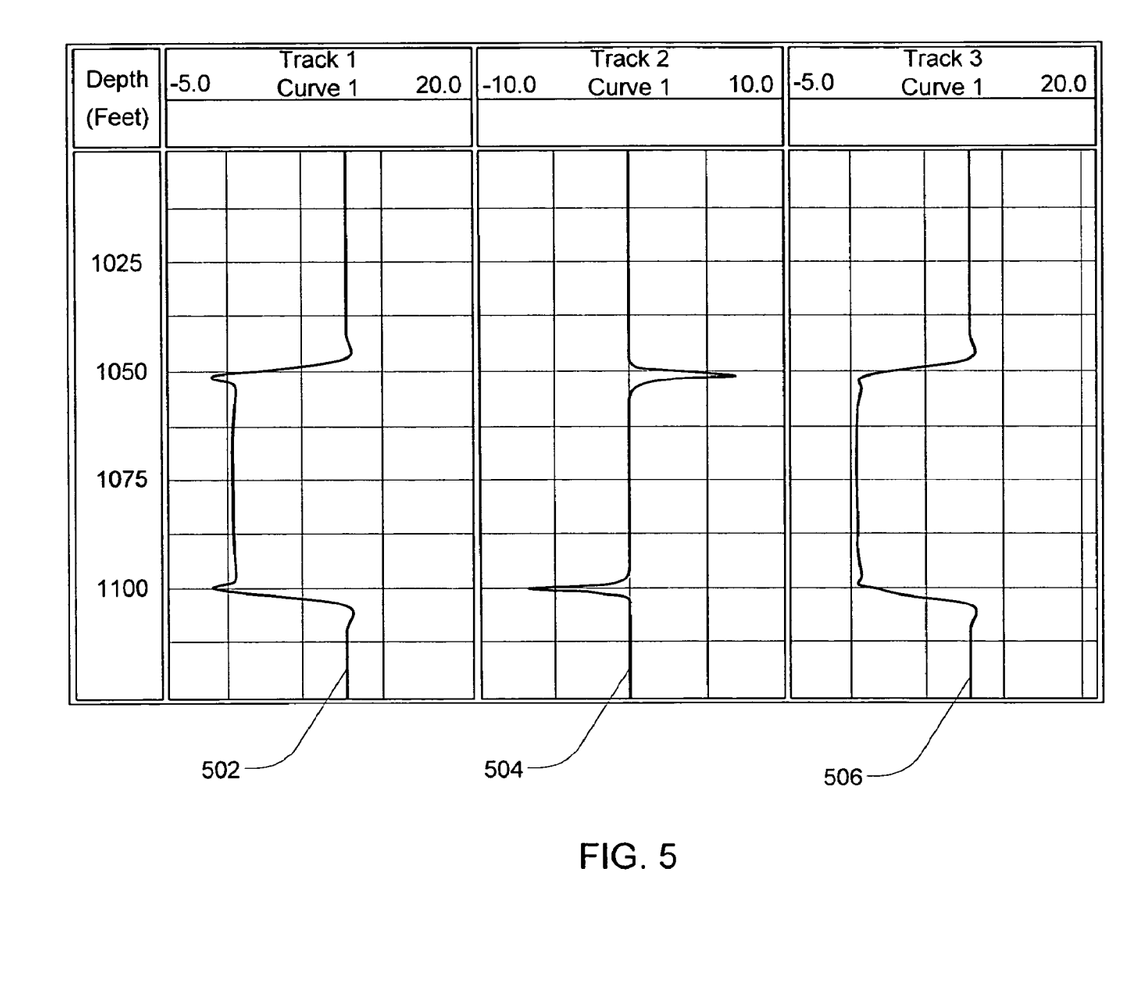
FIG. 5 shows illustrative logs of compensated phase difference, bed boundary indicator, and processed phase difference.

The compensated phase difference (or compensated attenuation measurement) offers a more symmetric response to formation beds than do the individual measurements in response to the first and second transmitters. FIG. 5 shows an illustrative log of compensated phase difference 502 as a function of depth for a model formation. The model formation has a fifty-foot thick bed with a resistivity of 50 Ωm between underlying and overlying beds having a resistivity of 1 Ωm. Note that the compensated phase difference 502 exhibits "horns", i.e., overshoots in the measurement at the bed boundaries. These artifacts in the response may appear to indicate the presence of additional beds where in fact they do not exist.

In block 430, the compensated measurement is processed to remove the artifacts. In some embodiments, the processing includes adding a function of the bed boundary indicator to suppress the horns, e.g.:

$$\delta_P = \delta_C + k \cdot \frac{1}{2\pi} \int_{-\pi}^{\pi} \|I(\gamma)\| d\gamma \tag{17}$$

where k is chosen to provide optimal removal of the horns. In some embodiments, k=−½. The compensation can alternatively be done in the resistivity domain:

$$R(\delta_P) = R(\delta_C) + k \cdot \frac{1}{2\pi} \int_{-\pi}^{\pi} \|I(\gamma)\| d\gamma \tag{18}$$

In block 432, the processed phase difference $\delta_P$ (or the resistivity determined from the processed phase difference, $R(\delta_P)$) is plotted as a function of tool position. As additional measurements are made, processed, and plotted, the user is provided with a formation resistivity log. In block 434, a check is made to determine if additional measurements are available. If so, the process repeats, beginning with block 405.

The foregoing method has been described as a simple sequence of actions for illustrative purposes. In practice, various method actions may be performed concurrently and independently by different tool components. In some embodiments, transmitters of different frequencies may be used to enable simultaneous measurements using both transmitters.

As mentioned above, FIG. 5 shows an illustrative log of the compensated phase difference 502, as calculated from equation (5) for a fifty-foot bed of 50 Ωm resistivity. A log of the bed boundary indicator 504 as calculated from equation (5) is also shown. Finally, there is shown a log of the processed phase difference 506 that results from the calculation of equation (17). A comparison of logs 502 and 506 reveal that the disclosed processing method nearly eliminates the horns from the response.

Figure 6:
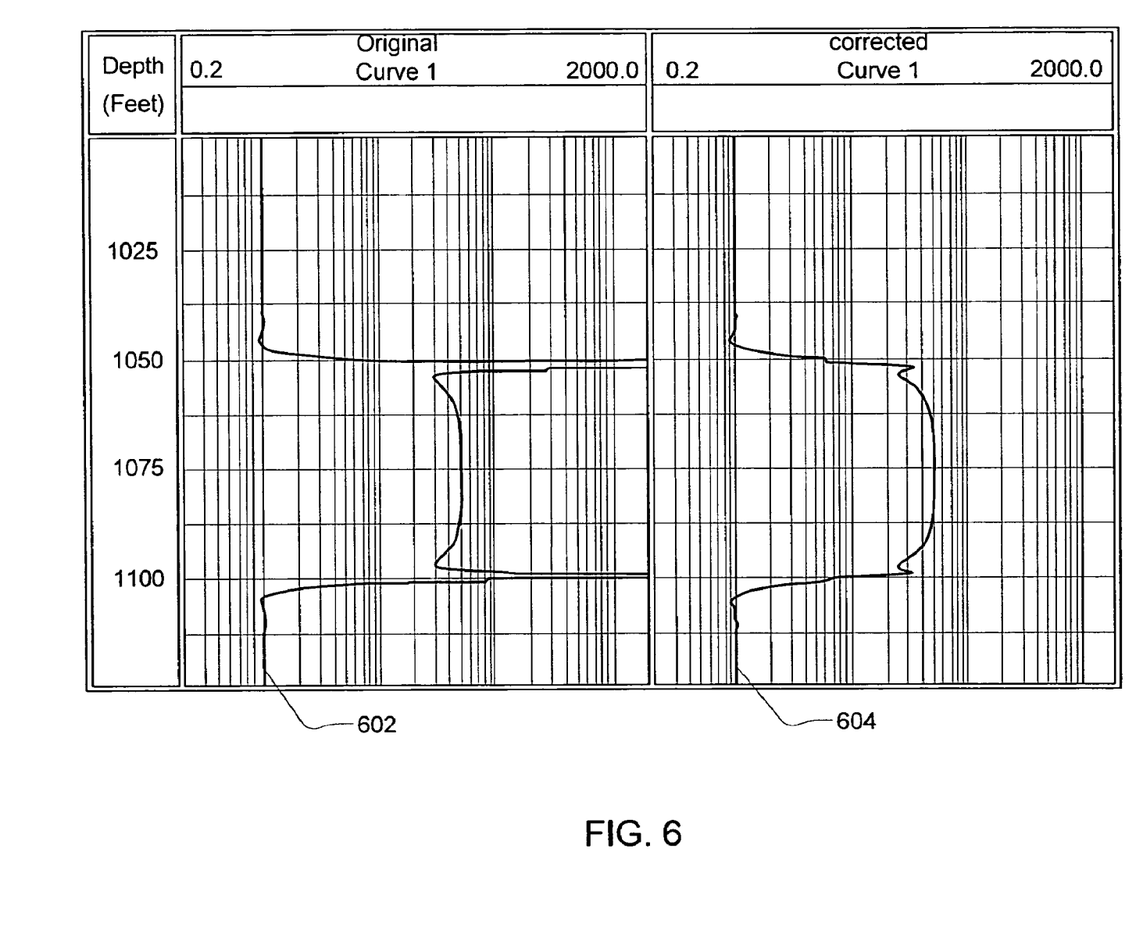
FIG. 6 shows illustrative resistivity logs determined from the compensated and processed phase differences.

FIG. 6 shows two illustrative resistivity logs. The first log of resistivity 602 is calculated from the compensated phase difference log 502, while the second log of resistivity 604 is calculated from the processed phase difference log 506. A comparison of the resistivity logs reveals that a substantial improvement in accuracy results from the processing method described in FIG. 4. Preferably, the compensate resistivity or phase difference log ###

In some system embodiments, the azimuthally-directed resistivity R(γ) logs are used alone or in conjunction with the bed boundary indicator I(γ) to determine distance and direction to nearby bed boundaries. In some cases, it is possible to estimate the formation resistivity on the far side of the boundary.

While the present invention has been described with respect to a limited number of embodiments, those skilled in the art will appreciate numerous modifications and variations therefrom. For example, the bed boundary indicator signal may be derived from a different set of transmitter and/or receiver antennas than the resistivity signal. It is intended that the appended claims cover all such modifications and variations as fall within the true spirit and scope of this present invention.

What is claimed is:

1. A logging method that comprises:
   logging a borehole with an azimuthally sensitive resistivity tool to obtain a resistivity log;
   generating a boundary indicator signal from at east two azimuthally sensitive resistivity measurements obtained at different azimuthal tool orientations;
   obtaining a modified resistivity educed boundary horns by combining the resistivity log with a function of the boundary indicator signal to reduce boundary horns present in the resistivity log; and
   displaying the modified resistivity log.

2. The method of claim 1, wherein said logging comprises:
   transmitting electromagnetic energy from at least one transmitter antenna into an earth formation, wherein the transmitter antenna is disposed within a plane that is oriented at a first angle relative to a longitudinal axis of a logging tool in a borehole penetrating the earth formation;
   receiving electromagnetic energy from the earth formation with at least one receiver antenna, wherein the receiver antenna is disposed within a plane that is oriented at a second, different angle relative to the longitudinal axis of the logging tool; and
   determining the log based at least in part on the electromagnetic energy received by the receiver antenna, wherein the first log exhibits horns at boundaries between beds of differing resistivity.

3. The method of claim 2, wherein said logging further comprises:
   determining the boundary indicator signal based at least in part on the electromagnetic energy received by said receiver antenna.

4. The method of claim 3, wherein said transmitting includes alternately transmitting electromagnetic energy from a second transmitter antenna that is symmetrically spaced relative to the at least one receiver, and wherein said determining the log includes averaging received signal measurements made in response to both the first and second transmitter antennas.

5. The method of claim 4, wherein said determining the boundary indicator signal includes subtracting signal measurements made in response to both the first and second transmitter antennas.

6. The method of claim 5, wherein said function includes an absolute value of the boundary indicator signal.

7. The method of claim 4, wherein the second angle is about 45° and the first angle is about 0°.

8. The method of claim 2, wherein said receiving includes receiving electromagnetic energy with at least two receiver antennas each oriented at the second angle relative to the longitudinal axis of the logging tool.

9. The method of claim 8, wherein the log is determined from a ratio of amplitudes of receiver voltages or a difference of phases of receiver voltages.

10. The method of claim 1, wherein the log is produced while drilling the borehole.

11. The method of claim 1, wherein said logging comprises:
    energizing a first transmitter antenna to radiate electromagnetic energy into a formation, wherein the first transmitter antenna is disposed within a plane oriented at a first angle relative to a longitudinal axis of a logging tool in a borehole in the formation;
    measuring a first phase difference between signals from a first and second receiver antennas while energizing the first transmitter antenna, wherein the first and second receiver antennas are each disposed within a plane oriented at a second angle relative to the longitudinal axis;
    energizing a second transmitter antenna to radiate electromagnetic energy into the formation, wherein the second transmitter antenna is positioned symmetrically opposite the first transmitter antenna relative to a midpoint between the first and second receiver antennas;
    measuring a second phase difference between signals from the first and second receiver antennas while energizing the second transmitter antenna;
    determining said log based at least in part on the first and second phase differences.

12. The method of claim 11, wherein said logging further comprises determining the bed boundary indicator signal from the first and second phase differences.

13. The method of claim 12, wherein said combining includes calculating a phase correction signal and applying the phase correction signal to an average of the first and second phase differences to obtain a processed phase difference having reduced boundary horns.

14. The method of claim 13, where said combining further includes determining a resistivity log based at least in part on the processed phase difference.

15. The method of claim 14, further comprising updating the log as new measurements of the first and second phase differences are collected.

16. The method of claim 14, further comprising displaying the resistivity log while the borehole is being logged.

* * * * *